US012321639B2

(12) United States Patent
Xue et al.

(10) Patent No.: US 12,321,639 B2
(45) Date of Patent: Jun. 3, 2025

(54) HYBRID SOLID STATE DRIVE (SSD) ARCHITECTURE USING MRAM AND NAND FOR IMPROVED POWER LOSS PROTECTION AND PERFORMANCE

(71) Applicant: Alibaba (China) Co., Ltd., Hangzhou (CN)

(72) Inventors: Fei Xue, Sunnyvale, CA (US); Wentao Wu, Shanghai (CN); Jiajing Jin, Hangzhou (CN); Xiang Gao, Shanghai (CN); Jifeng Wang, Chengdu (CN); Yuming Xu, Chengdu (CN); Jiu Heng, Chengdu (CN); Hongzhong Zheng, Los Gatos, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 101 days.

(21) Appl. No.: 18/309,825

(22) Filed: Apr. 30, 2023

(65) Prior Publication Data

US 2024/0118835 A1    Apr. 11, 2024

(30) Foreign Application Priority Data

Oct. 10, 2022    (CN) .......................... 202211234244.7

(51) Int. Cl.
*G06F 12/00* (2006.01)
*G06F 3/06* (2006.01)

(52) U.S. Cl.
CPC .......... *G06F 3/0659* (2013.01); *G06F 3/0652* (2013.01); *G06F 3/0679* (2013.01); *G06F 3/0607* (2013.01)

(58) Field of Classification Search
CPC .... G06F 3/0659; G06F 3/0652; G06F 3/0679; G06F 3/0607; G06F 3/068; G06F 3/0619; G06F 3/0656; G06F 11/07
USPC ........................................................ 711/154
See application file for complete search history.

(56) References Cited

U.S. PATENT DOCUMENTS

| | | | |
|---|---|---|---|
| 10,528,469 B2 | 1/2020 | Koo et al. |
| 10,567,006 B2 | 2/2020 | Hahn et al. |
| 10,642,496 B2 | 5/2020 | Benisty et al. |
| 10,643,707 B2 | 5/2020 | Rajamani et al. |
| 10,658,056 B2 | 5/2020 | Natarajan et al. |
| 10,725,956 B2 | 7/2020 | Eilert et al. |
| 10,761,779 B2 | 9/2020 | Trika et al. |
| 10,846,175 B2 | 11/2020 | Parthasarathy et al. |
| 10,853,268 B2 | 12/2020 | Imazaki et al. |
| 10,860,508 B2 | 12/2020 | Bolkhovitin et al. |
| 10,896,089 B2 | 1/2021 | Helmick et al. |
| 11,243,700 B2 | 2/2022 | Lee et al. |

(Continued)

*Primary Examiner* — Mardochee Chery
(74) *Attorney, Agent, or Firm* — Sheppard Mullin Richter & Hampton LLP

(57) ABSTRACT

An SSD includes an MRAM, an NAND memory, and an SSD controller. The SSD controller is configured to receive first data from a host machine, save the first data to an SSD data buffer, fetch the first data from the SSD data buffer and write the first data to the MRAM via the MRAM controller, determine, by the data allocation circuit based on a characteristic of the first data, whether to save the first data to the MRAM or the NAND memory, and in response to determining saving the first data to the NAND memory, read the first data from the MRAM, write the first data to the NAND memory, and erase the first data from the MRAM.

20 Claims, 8 Drawing Sheets

(56) References Cited

U.S. PATENT DOCUMENTS

| | | | |
|---|---|---|---|
| 11,281,601 B2 | 3/2022 | Subbarao et al. | |
| 11,379,151 B2 | 7/2022 | Saxena et al. | |
| 11,474,722 B2 | 10/2022 | Christensen | |
| 11,579,973 B2 | 2/2023 | Singhai et al. | |
| 2010/0037001 A1* | 2/2010 | Langlois | G06F 12/0246 |
| | | | 711/E12.083 |
| 2011/0208897 A1* | 8/2011 | Lee | G11C 11/5642 |
| | | | 711/E12.001 |
| 2019/0243577 A1* | 8/2019 | Pelster | G06F 3/0659 |
| 2020/0192792 A1 | 6/2020 | Cho et al. | |
| 2021/0042254 A1 | 2/2021 | Marolia et al. | |
| 2022/0137835 A1 | 5/2022 | Malakapalli et al. | |
| 2022/0334771 A1 | 10/2022 | Kanno | |

* cited by examiner

HYBRID SOLID STATE DRIVE (SSD) ARCHITECTURE USING MRAM AND NAND FOR IMPROVED POWER LOSS PROTECTION AND PERFORMANCE

CROSS REFERENCE TO RELATED APPLICATION

This application claims priority to and benefits of Chinese patent Application No. 202211234244.7, filed with the China National Intellectual Property Administration (CNIPA) on Oct. 10, 2022. The entire contents of the above-identified application are incorporated herein by reference.

TECHNICAL FIELD

This disclosure is generally related to a solid state drive (SSD) and methods for operating the SSD, and more specifically to a SSD having a magnetoresistive random-access memory (MRAM) and methods for operating the SSD.

BACKGROUND

Traditional SSD use NAND flash memory as main data storage media. It provides many desired properties such as high density, low cost, non-volatile as compared to static random-access memory (SRAM) and dynamic random-access memory (DRAM), and fast access and low latency as compared to hard disc drive (HDD). In recent years, emerging non-volatile memories become more and more popular. Several non-volatile RAMs (NVRAM) have been developed and analyzed to be applied to memory/storage systems. NVRAMs can be added as a new layer between DRAM and NAND flash in an SSD system and provides more flexibility. MRAM is one of the most mature NVRAMs to be launched. MRAM has many merits, such as byte-addressable, fast read/write, higher reliability (as compared to NAND), and non-volatile (as compared to DRAM).

SUMMARY

Described herein are SSD devices and methods to for and operate hybrid media system architecture in SSD using MRAM and NAND memory. One major issue of multi-level cell (such as two or more) NAND flash memories is power loss protection. Techniques disclosed herein provide an SSD having an MRAM and an NAND memory and methods for operating the SSD.

In one aspect, an SSD is provided. The SSD includes an MRAM, an NAND memory and an SSD controller coupled to the MRAM and the NAND memory. The SSD controller includes a data allocation circuit configured to determine saving data to one of the MRAM or the NAND memory and an MRAM controller coupled to the MRAM and configured to read data from or write data to the MRAM. The SSD controller is configured to receive first data from a host machine, save the first data to an SSD data buffer, fetch the first data from the SSD data buffer and write the first data to the MRAM via the MRAM controller, determine, by the data allocation circuit based on a characteristic of the first data, whether to save the first data to the MRAM or the NAND memory, and in response to determining saving the first data to the NAND memory, read the first data from the MRAM, write the first data to the NAND memory, and erase the first data from the MRAM.

In some embodiments, the SSD controller is configured to, in response to determining saving the first data to the MRAM, retain the first data at the MRAM.

In some embodiments, the SSD controller is further configured to record in an addressing table a physical address of the first data at the MRAM or the NAND memory.

In some embodiments, the SSD controller is further configured to save the addressing table at the MRAM, the NAND memory, or a DRAM coupled to the SSD controller.

In some embodiments, the SSD controller is further configured to: receive a read command from the host machine for reading second data, look up, by the data allocation circuit, the addressing table to determine whether the second data are saved at the MRAM or the NAND memory, in response to determining that the second data are saved at the MRAM, fetch the second data from the MRAM and save the second data to the SSD data buffer, in response to determining that the second data are saved at the NAND memory, fetch the second data from the NAND memory and save the second data to the SSD data buffer, and fetch the second data from the SSD data buffer and send the second data to the host machine.

In some embodiments, the SSD controller is further configured to: determine whether a number of read access from the host machine to the second data over a time duration exceeds a threshold, and in response to that the number of read access to the second data over the time duration from the host machine exceeds the threshold and in response to determining that the second data are saved at the NAND memory, relocate the second data from the NAND memory to the MRAM, erase the second data from the NAND memory, and update a physical address of the second data in the addressing table.

In some embodiments, the rectifier control circuit is configured to second regulate the FET for a second time period, wherein the second time period is shorter than the first time period.

In some embodiments, the data allocation circuit is configured to: calculate a read access frequency of each logic block on the MRAM and the NAND memory, select a threshold frequency based on a storage capacity of the MRAM, determining whether the read access frequency of each logic block on the MRAM and the NAND memory exceeds the threshold frequency, in response to determining that a read access frequency of a logic block on the MRAM does not exceed the threshold frequency, relocate data stored at the logic block on the MRAM to the NAND memory, and in response to determining that a read access frequency of a logic block on the NAND memory exceeds the threshold frequency, relocate data stored on the logic block on the NAND memory to the MRAM.

In some embodiments, the data allocation circuit includes a machine learning model. The machine learning model includes a data allocation engine and a data relocation engine. The machine learning model is configured to, in response to receiving a read command from the host machine for reading second data stored on the SSD: calculate a read access frequency of the second data, obtain a current state of the machine learning model, input the read access frequency of the second data and the current state of the machine learning model into the data allocation engine for the data allocation engine to determine whether the second data are to be saved on the MRAM or the NAND memory and to generate a determination result, input the determination result of the data allocation engine into the data relocation engine for the data relocation engine to determine whether to relocate the second data between the MRAM and the NAND memory, calculate a read access latency for accessing the second data stored on the SSD, and generate a machine learning sample comprising the read access frequency of the second data, the current state of the machine learning model, an output of the data relocation engine, and the read access latency.

In some embodiments, the SSD controller is further configured to flush, in response to a power loss, all data at the SSD data buffer to the MRAM.

In another aspect, an apparatus is provided. The apparatus includes a host machine and an SSD. The SSD includes an MRAM, an NAND memory and an SSD controller coupled to the MRAM and the NAND memory. The SSD controller includes a data allocation circuit configured to determine saving data to one of the MRAM or the NAND memory and an MRAM controller coupled to the MRAM and configured to read data from or write data to the MRAM. The SSD controller is configured to receive first data from a host machine, save the first data to an SSD data buffer, fetch the first data from the SSD data buffer and write the first data to the MRAM via the MRAM controller, determine, by the data allocation circuit based on a characteristic of the first data, whether to save the first data to the MRAM or the NAND memory, and in response to determining saving the first data to the NAND memory, read the first data from the MRAM, write the first data to the NAND memory, and erase the first data from the MRAM.

In yet another aspect, a method for operating a SSD is provided. The SSD includes an MRAM, an NAND memory, and an SSD controller coupled to the MRAM and the NAND memory. The method includes: receiving, by the SSD controller, first data from a host machine, saving, by the SSD controller, the first data to an SSD data buffer, fetching, by the SSD controller, the first data from the SSD data buffer and write the first data to the MRAM, determining, by the SSD controller based on a characteristic of the first data, whether to save the first data to the MRAM or the NAND memory, and in response to determining saving the first data to the NAND memory, reading, by the SSD controller, the first data from the MRAM, writing the first data to the NAND memory, and erasing the first data from the MRAM.

In some embodiments, the SSD controller includes a machine learning model. The machine learning model includes a data allocation engine and a data relocation engine, and is configured to, in response to receiving a read command from the host machine for reading second data stored on the SSD: calculate a read access frequency of the second data, obtain a current state of the machine learning model, input the read access frequency of the second data and the current state of the machine learning model into the data allocation engine for the data allocation engine to determine whether the second data are to be saved on the MRAM or the NAND memory and to generate a determination result, input the determination result of the data allocation engine into the data relocation engine for the data relocation engine to determine whether to relocate the second data between the MRAM and the NAND memory, calculate a read access latency for accessing the second data stored on the SSD, and generate a machine learning sample comprising the read access frequency of the second data, the current state of the machine learning model, an output of the data relocation engine, and the read access latency.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized, and the accompanying drawings of which:

DETAILED DESCRIPTION OF EMBODIMENTS

Figure 1:
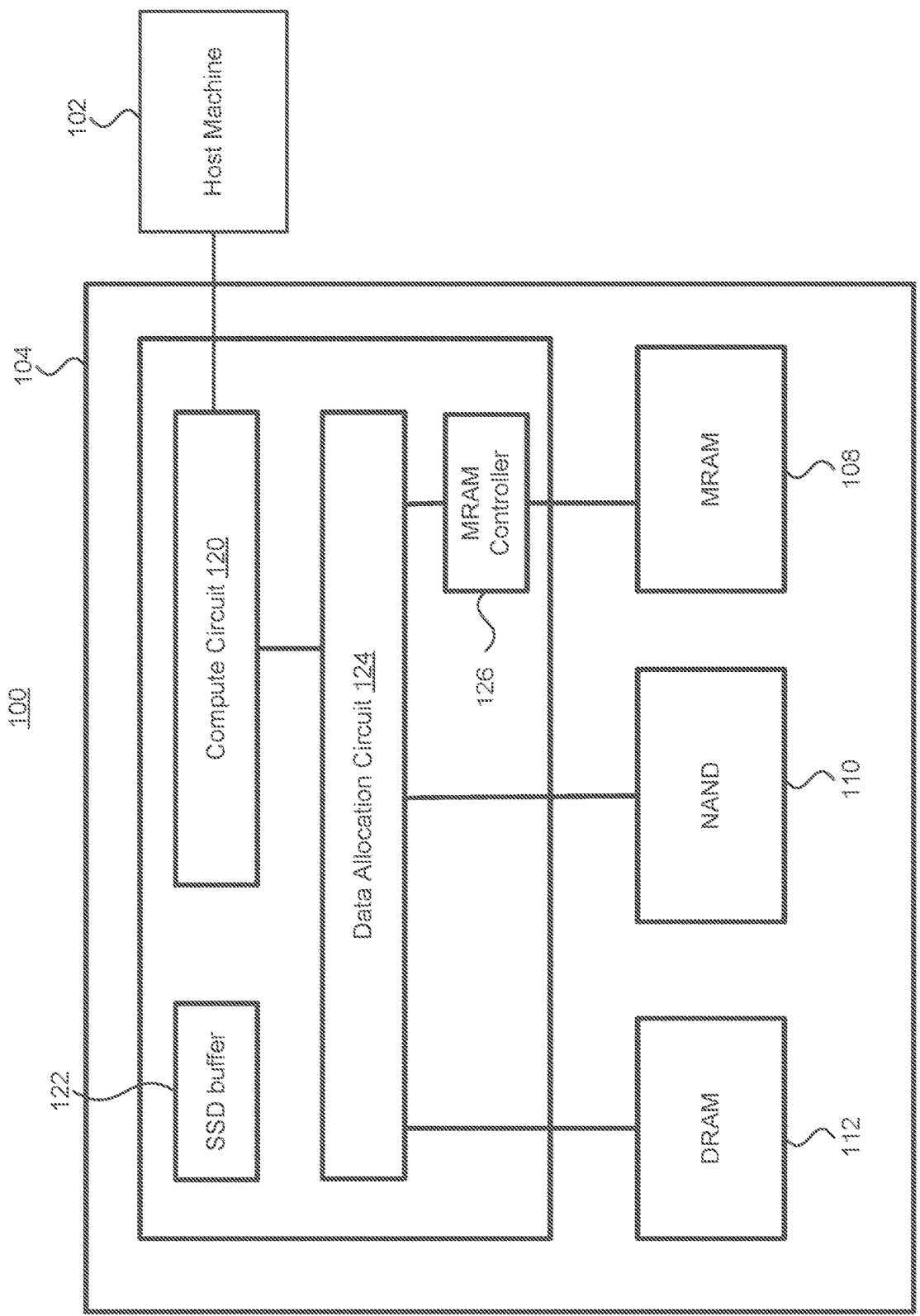
FIG. 1 is a block diagram depicting a system, according to one example embodiment.

In the following description, certain specific details are set forth in order to provide a thorough understanding of various embodiments of the disclosure. However, one skilled in the art will understand that the disclosure may be practiced without these details. Moreover, while various embodiments of the disclosure are disclosed herein, many adaptations and modifications may be made within the scope of the disclosure in accordance with the common general knowledge of those skilled in this art. Such modifications include the substitution of known equivalents for any aspect of the disclosure in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment, but may be in some instances.

Furthermore, the particular features, structures, or characteristics may be combined in any suitable manner in one or more embodiments.

Various embodiments are directed to applying hybrid media system architecture in SSD using MRAM and NAND. Several types of NAND memory are currently in use. For example, a single-level cell (SLC) NAND memory includes one bit per cell and two possible voltage states. A multi-level cell (MLC) NAND memory includes two bits per cell and thus four possible voltage states. A Triple-level cell (TLC) NAND memory includes three bits per cell and eight possible voltage states. And a quad-level cell (QLC) NAND memory includes four bits per cell and sixteen possible voltage states. NAND memory having more levels than QLC NAND memory is contemplated in this disclosure, and techniques disclosed herein are applicable to those NAND memory devices (interchangeable with NAND memory or NAND as used in this disclosure).

One major issue of NAND memory devices having multi-level cells (two or more) is power loss protection. Due to complicate program models for NAND memory devices having multi-level cells, they need large memory space to hold the data which has been received by the SSD but have not been written to the NAND. Once power loss happen, the data need large capacitor support to make sure they can be saved to the NAND. MRAM can be used in this case as a data buffer, since data written on MRAM is power loss safe. High write/read speed of MRAM can also be used as write buffer to improve system performance. The disclosed SSD includes a data allocation circuit that uses machine learning algorithm to separate hot/cold data for distribution on MRAM and NAND.

As traditional SSD moving from TLC NAND to QLC NAND to reduce cost, NAND write time is extended. It is more and more challenging to maintain high bandwidth especially under write heavy workload. Also, QLC NAND has a special program mode which requires to cache much more data before data can be safely saved to the QLC NAND. Thus power loss protection becomes more complicated.

Disclosed is a system with MRAM and NAND hybrid architecture. MRAM is used as write cache and used to store hot data (data that has an access frequency greater than a threshold) and/or system meta data. The NAND is used to save host data. A data allocation circuit is provided, which uses machine learning algorithm to balance data written to MRAM and NAND.

In the disclosed system, MRAM is added as one memory layer (a standalone memory) with NAND (and in some embodiments, also with DRAM). An MRAM controller is placed on the SSD controller for controlling the MRAM. For example, the interface of MRAM to the SSD controller may be non-volatile dual in-line memory module (NVDIMM). Command to access MRAM (read, write, reset, etc.) is sent to MRAM by the SSD controller via the MRAM controller. In some embodiments, the MRAM is configured to store host data that are configured to be written to the NAND. The host data may be first temporarily saved on the MRAM. In the conventional technology, host data are generally first written to the DRAM and later moved from the DRAM to the NAND. However, due to program model for the NAND, large size of the data need to be buffered. Due to limited power backup for a conventional system, during power loss, the host data are lost. According to the techniques disclosed herein, the host data are written to the MRAM, which is non-volatile, less power backup is needed in the SSD system as the host data would not be lost even in a sudden power loss.

In some embodiments, the MRAM is configured to store system meta data, such as drive status, addressing table, etc. During power loss, system data can be saved at the MRAM and moving them to the NAND is not required.

In some embodiments, the MRAM is configured to store hot host data that are frequently accessed by the host machine. Maintaining hot data on MRAM provides fast read access, reducing access latency. The techniques disclosed herein can allocate hot and cold data by a data allocation circuit on the SSD controller.

Reference is first made to FIG. 1. FIG. 1 is a block diagram depicting a system 100, according to one example embodiment. For example, the system may be any computer system, such as a server tower, a server deck, a server, a desktop, a laptop, a notebook computer, a tablet, a smart phone, etc. The system 100 includes a host machine 102 and an SSD 104. The host machine may include one or more microprocessors and one or more host buffers/memories. The SSD 104 includes an SSD controller 106, an MRAM 108, and an NAND memory 110. The MRAM 108 and the NAND memory 110 are coupled to the SSD controller 106 in parallel. In some embodiments, the SSD 104 may further include a DRAM 112. The SSD controller 106 includes a compute circuit 120, an SSD data buffer 122, a data allocation circuit 124, and an MRAM controller 126.

The MRAM 108 is configured to store/save data before the SSD controller 106 determines whether to save the data to the MRAM 108 or the NAND memory 110, or in some instances to the DRAM 112. For example, the host machine 102 may send data to the SSD 104 for storage. After receiving the data from the host machine 102, the SSD controller saves it to the SSD data buffer 122, and then fetches the data from the SSD data buffer 122 and writes the data to the MRAM 108 via the MRAM controller 126.

The SSD controller 106 is configured to use the data allocation circuit 124 to determine where to save the data. If the data are to be saved at the NAND memory 110, the data are read by the SSD controller 106 through the MRAM controller 126 from the MRAM 108 and saved into the NAND 110. The SSD controller 106 also erases the data from the MRAM 106 through the MRAM controller 126. If the data are determined to be saved at the MRAM, the SSD controller 106 retains the data in the MRAM 108. In some embodiments, when the data are to be saved at the DRAM 112, the data are read by the SSD controller 106 through the MRAM controller 126 from the MRAM 108 and saved into the DRAM 112. The SSD controller 106 also erases the data from the MRAM 106 through the MRAM controller 126.

After the SSD controller 106 saves the data from the host machine to a destination (i.e., the MRAM 108, the NAND memory 110, or the DRAM 112), the SSD controller is further configured to record in an addressing table a physical address of the data at the MRAM 108 or the NAND memory 110 or the DRAM 112. This can facilitate a read operation of the data later to quickly identify the physical address of the data. In some embodiments, the addressing table may be saved at the MRAM 108 for fast look up by the SSD controller 106. The addressing table is constantly updated to include new addresses of new data and data relocated between the MRAM 108 and the NAND memory 110. The size of the addressing table may increase and become quite large. In some embodiments, when the size of the addressing table becomes large, in order to leave sufficient space for saving hot host/system data at the MRAM 108, the SSD controller 106 can relocate the addressing table to the DRAM 112 or the NAND memory 110. In some embodiments, changes to the addressing table may be first stored at the MRAM 108 and relocated to the DRAM 112 or the NAND memory 110 at a certain frequency.

In a read operation, the SSD controller 106 may receive a read command from the host machine 102 for reading certain data. After that, the SSD controller 106 looks up, by the data allocation circuit, the addressing table to determine whether the data are saved at the MRAM 108 or the NAND memory 110 (or the DRAM 112). When the data are saved at the MRAM 108, the SSD controller 106 fetches the data from the MRAM 108 and saves the data to the SSD data buffer 122. When the data are saved at the NAND memory 110, the SSD controller 106 fetches the data from the NAND memory 110 and saves the data to the SSD data buffer 122. The SSD controller 106 then fetches the data from the SSD data buffer 122 and sends the requested data to the host machine 102.

After receiving the read command from the host machine 102 for reading the data, the SSD controller 106 may determine whether a number of read access from the host machine 102 to the data over a time duration exceeds a threshold. If the number of read access from the host machine 102 to the data over the time duration exceeds the threshold, the SSD controller 106 can determine that the data are "hot," meaning the host machine 102 has frequently requested access to the data. In order to allow the host machine 102 to fast access the data, the SSD controller 106 can save the data in the MRAM 108 as its response time is generally faster than the NAND memory. In some embodiments, after the SSD controller 106 determines that the data are hot, the SSD controller 106 further determines whether the data are saved in the MRAM 108 by, e.g., looking up the physical address of the data in the addressing table. If the data are saved in the MRAM 108, the SSD controller 106 takes no further action and retains the data at the MRAM 108. If the data are saved at the NAND memory 110 (or the DRAM 112), the SSD controller 106 relocates the data from the NAND memory 110 to the MRAM 108, erases the data from the NAND memory 110, and updates a physical address of the data in the addressing table. The SSD controller 106 may be configured to perform the above action whenever it receives a read access request from the host machines 102.

In some embodiments, to have a holistic view of the data stored on the SSD 104, the SSD controller 106 may inspect all data stored at the MRAM 108 and the NAND memory 110 (and/or the DRAM 112 if the DRAM 112 stores any host data) to identify "hot" and "cold" data. In some embodiments, the SSD controller 106 may use the data allocation circuit 124 to determine whether the data are hot or cold. For example, the data allocation circuit 124 may calculate a read access frequency of each logic block on the MRAM 108 and the NAND memory 110. Moreover, the data allocation circuit 124 may select a threshold frequency based on a storage capacity of the MRAM 108. For example, when the storage capacity of the MRAM 108 is relatively large, the data allocation circuit 124 can select a relatively lower threshold frequency to save more hot data at the MRAM 108. On the contrary, when the storage capacity of the MRAM 108 is relatively small, the data allocation circuit 124 can select a relatively higher threshold frequency to avoid saving too much hot data at the MRAM 108 that may hinder the normal operation of the SSD controller 106 on the MRAM 108. Other methods for selecting a threshold frequency is contemplated. For example, the data allocation circuit 124 may use a mean or average access frequency of all logic blocks as the threshold frequency. In this embodiment, data having access frequencies not exceeding the mean or average access frequency are considered cold data and are to be saved at the NAND memory 110, while data having access frequencies exceeding the mean or average access frequency are considered hot data and are to be saved at the MRAM 108.

After the threshold frequency is determined/selected, the data allocation circuit 124 determines whether the read access frequency of each logic block on the MRAM 108 and the NAND memory 110 exceeds the threshold frequency. When a read access frequency of a logic block on the MRAM 108 does not exceed the threshold frequency (i.e., cold data), the data allocation circuit 124 relocates data stored at the logic block on the MRAM 108 to the NAND memory 110. When a read access frequency of a logic block on the MRAM 108 exceeds the threshold frequency (i.e., hot data), the data allocation circuit 124 takes no further action and retains the data at the MRAM 108. When a read access frequency of a logic block on the NAND memory 110 does not exceed the threshold frequency (i.e., cold data), the data allocation circuit 124 takes no further action and retains the data at the NAND memory 110. When a read access frequency of a logic block on the MRAM 108 exceeds the threshold frequency (i.e., hot data), the data allocation circuit 124 relocates data stored at the logic block on the NAND memory 110 to the MRAM 108. These operations allow the host machine 102 have a quick access to host data to reduce access latency and improve system efficiency.

Figure 2:
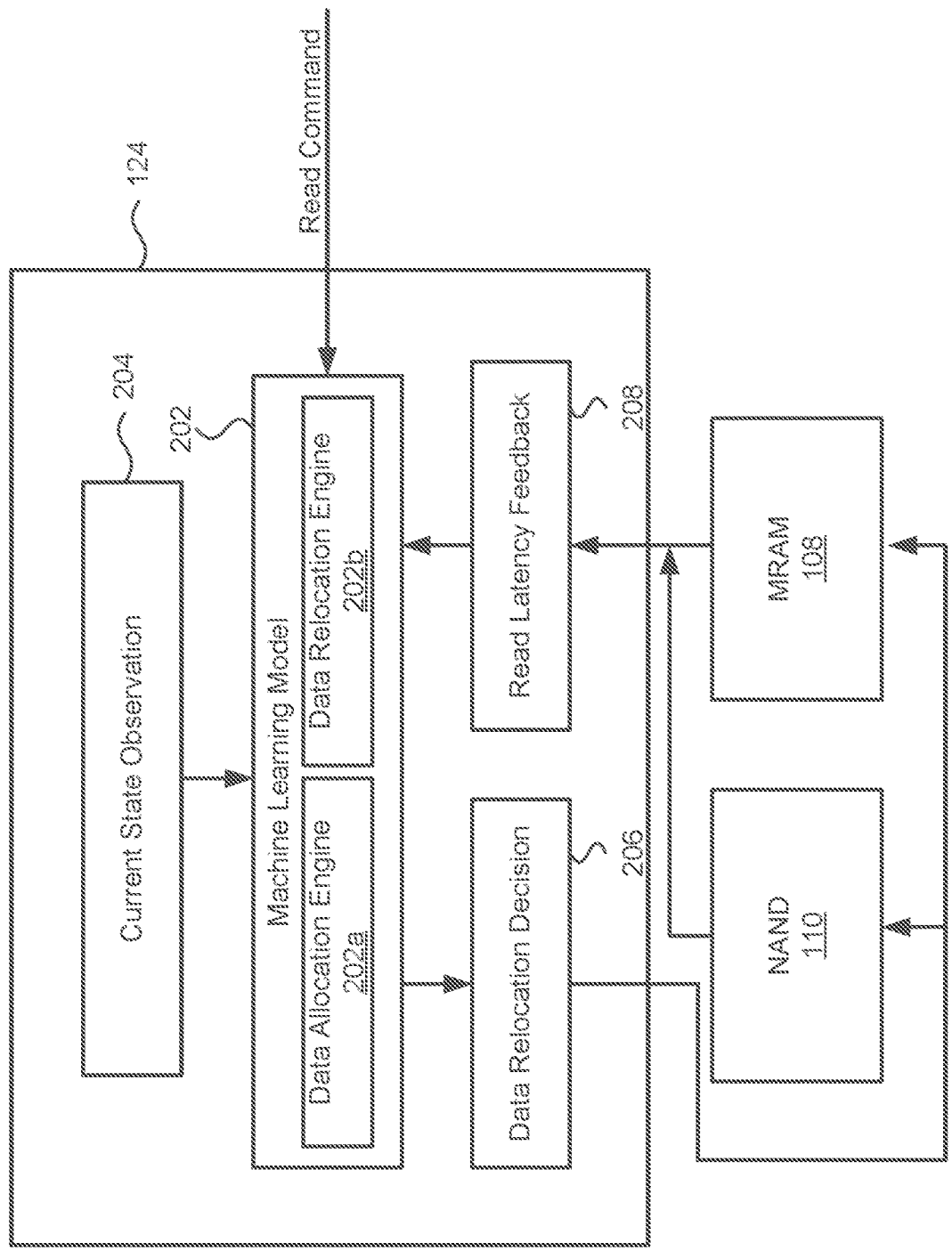
FIG. 2 is a block diagram depicting an data allocation circuit and its interactions with MRAM and NAND memory, according to one example embodiment.

In some embodiments, the data allocation circuit 124 of the SSD controller 106 a machine learning model for determining whether the data are hot and where to save the data. Reference is made to FIG. 2. FIG. 2 is a block diagram depicting the data allocation circuit 124 and its interactions with the MRAM 108 and the NAND memory 110, according to one example embodiment. The data allocation circuit 124 includes a machine learning model 202 for determining whether the data are hot and saving the data to the MRAM 108 or the NAND memory 110. The machine learning model 202 may be trained by initial training samples and training samples generated by the data allocation circuit 124 when processing prior read commands (read access requests) from the host machines 102. When trained with more and more training samples, the accuracy of the machine learning model 202 in making data allocation decisions (e.g., where to save the data) is gradually improved.

The machine learning model 202 includes a data allocation engine 202*a* configured to determine whether to save the data to the MRAM 108 or the NAND memory 110 and a data relocation engine 202*b* configured to determine whether to relocate the data from the MRAM 108 to the NAND memory 110, or vice versa.

The data allocation circuit 124 includes other functional blocks, such as a current state observation block 204 configured to observe the current state of the machine learning model 202. When receiving a read command from the host machine 102, the current state observation block 204 may obtain the current/latest model parameters for the machine learning model 202 and input them to the data allocation engine 202*a* of the machine learning model 202. The read command also triggers the machine learning model 202 to calculate a read access frequency of the data requested by the read command. The read access frequency of the data and the current state of the machine learning model 202 are input into the data allocation engine 202*a* for the data allocation engine 202*a* to determine whether the data are to be saved on the MRAM or the NAND memory to maximize the access speed or minimize the access latency of the data. The determination result of the data allocation engine 202a is provided to the data relocation engine 202b for the data relocation engine 202b to determine whether to relocate the data between the MRAM and the NAND memory. For example, the data allocation engine 202a may determine that the data are hot and should be saved to the MRAM 108. This result is sent to the data relocation engine 202b. The data relocation engine 202b may look up the addressing table to know where the data are currently saved. For example, if the data are currently saved at the NAND memory 110, which is inconsistent with the determination result from the data allocation engine 202a, the data relocation engine 202b can make a decision to relocate the data from the NAND memory 110 to the MRAM 108, and to erase the data from the NAND memory 110 after the relocation is complete. Or if the data are currently saved at the MRAM 108, which is consistent with the determination result from the data allocation engine 202a, the data relocation engine 202b can make a decision to retain the data at the MRAM 108 and take further action with respect to the data.

In some embodiments, the data allocation engine 202a may determine that the data are cold and should be saved to the NAND memory 110. This result is sent to the data relocation engine 202b. The data relocation engine 202b may look up the addressing table to know where the data are currently saved. For example, if the data are currently saved at the NAND memory 110, which is consistent with the determination result from the data allocation engine 202a, the data relocation engine 202b can make a decision to retain the data at the NAND memory 110 and take further action with respect to the data. Or if the data are currently saved at the MRAM 108, which is inconsistent with the determination result from the data allocation engine 202a, the data relocation engine 202b can make a decision to relocate the data from the MRAM 108 to the NAND memory 110, and to erase the data from the MRAM 108 after the relocation is complete.

The data relocation decision from the data relocation engine 202b is provided to a Data Relocation Decision block 206 to implement the data relocation decision as explained above. Although not shown, the data relocation decision is transmitted to the MRAM 108 and the NAND memory 110 via the MRAM controller 126 as shown in FIG. 1.

In some embodiments, the MRAM 108 and the NAND memory 110 may be configured to report data access latency to the data allocation circuit 124. For example, each of the MRAM 108 and the NAND memory 110 may be configured to record a time stamp when a requested data are fetched to the SSD data buffer 122 (FIG. 1). The time stamps are reported to the Read Latency Feedback block 208 of the data allocation circuit 124 for the Read Latency Feedback block 208 to determine a time difference between a time delay between a time when the read command is received and a time when the request data are fetched. In another example, the time when the read command is received can be send to the MRAM 108 and the NAND memory 110 to allow the MRAM 108 and the NAND memory 110 determine the access latency locally. The MRAM 108 and the NAND memory 110 can then report the access latency to the Read Latency Feedback block 208 of the data allocation circuit 124. The methods of obtaining read latency feedback are not limited to these examples. Other methods for calculating and reporting the access latency currently know or hereafter developed are within the scope of this disclosure.

Figure 3:
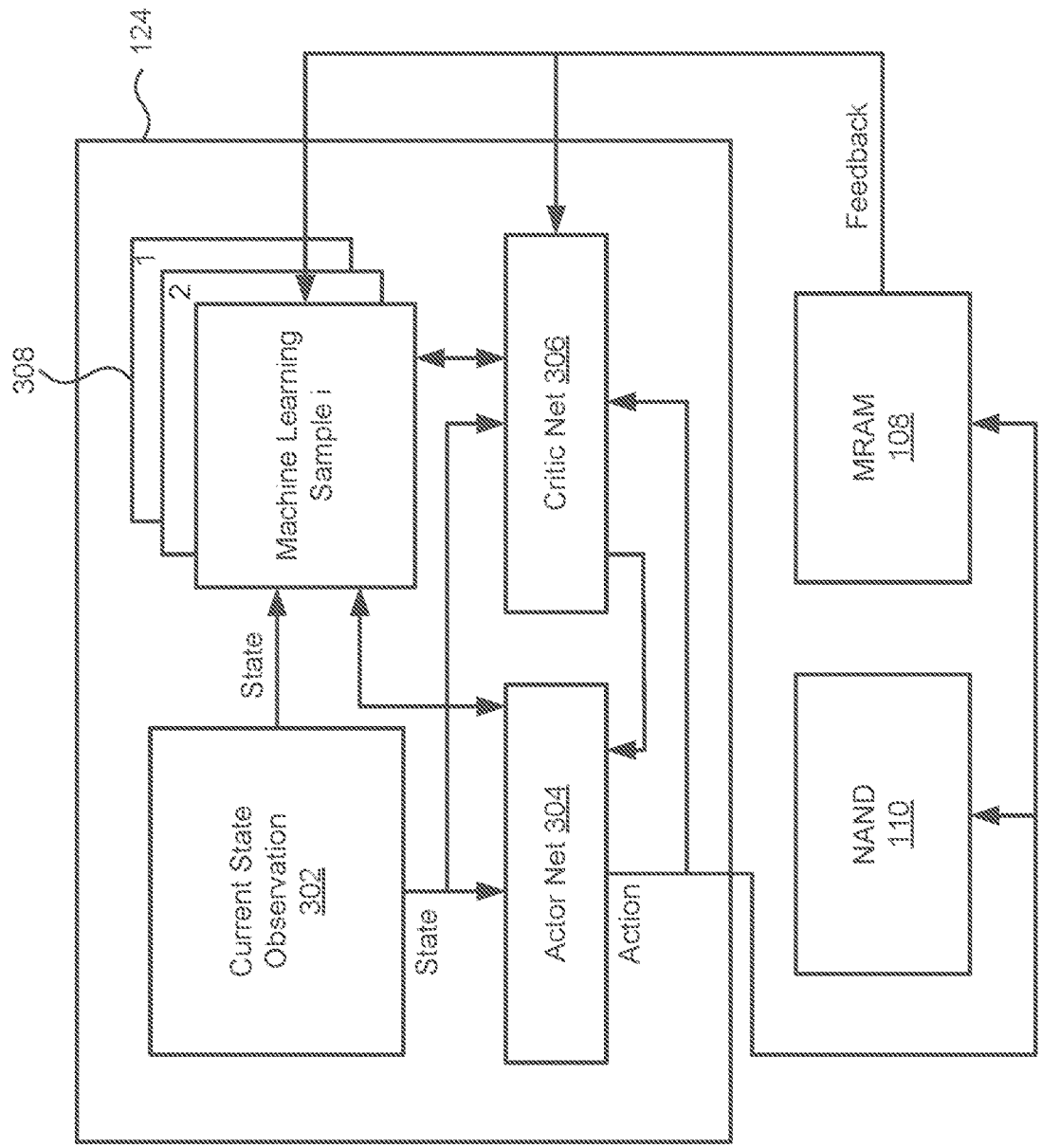
FIG. 3 is a block diagram depicting an data allocation circuit and its interactions with MRAM and NAND memory, according to one example embodiment.

In some embodiments, the machine learning model 202 may be implemented by a neural network. For example, the neural network may adopt reinforcement learning algorithm. FIG. 3 is a block diagram depicting the data allocation circuit 124 and its interactions with the MRAM 108 and the NAND memory 110, according to one example embodiment. As shown in FIG. 3, the data allocation circuit 124 includes a current state observation block 302, an actor net 304, a critic net 306, and machine learning sample repository 308. The current state observation block 302 is similar to the current state observation block 204 of FIG. 2 and is configured to observe the current state of the actor net 304 and the critic net 306. When receiving a read command from the host machine 102, the current state observation block 302 may obtain the current parameters for the actor net 304 and the critic net 306. The current state observation block 302 also shares the current state with the machine learning sample repository 308 for the machine learning sample repository 308 to generate a machine learning/training sample.

The actor net 304 and the critic net 306 are trained by the samples from the machine learning sample repository 308. The training samples may be imported from another repository and generated locally at the data allocation circuit 124 based on feedbacks from the MRAM 108 and the NAND memory 110, as will be explained herein. The actor net 304 is configured to determine an action for saving the data to the MRAM 108 and the NAND memory 110. The actor net 304 takes in, as its input, the read command, the current state (e.g., the current parameters) of the actor net 304, and an output of the critic net 306, and outputs an action to the MRAM 108 and the NAND memory 110. For example, the action may be to read the data from the MRAM 108 or the NAND memory 110, and to relocation the data from the MRAM 108 to the NAND memory 110 or vice versa, or retain the data in the MRAM 108 or the NAND memory 110. After the action is executed at the MRAM 108 and the NAND memory 110, the MRAM 108 and the NAND memory 110 are configured to report feedbacks indicative of access latency associated with the read access to the critic net 306 and the machine learning sample repository 308. In some embodiments, in generating the action, the actor net 304 is configured to calculate a read access frequency of the data requested by the read command and provides the read access frequency to the machine learning sample repository 308.

The critic net 306 takes in the current state of the critic net 306 from the current state observation block 302, the action taken by the actor net 304, and the feedback from the MRAM 108 and the NAND memory 110 as input to generate a critic. The critic net 306 shares the generated critic with the actor net 304 and the machine learning sample repository 308. Based on the outputs from the actor net 304 and the critic net 306, and the feedback from the MRAM 108 and the NAND memory 110, the machine learning sample repository 308 generates a machine leaning sample including the read access frequency of the data, the current state of the actor net 304 and the critic net 306 (e.g., a machine learning model), the action generated by the actor net 304, and a read access latency for the read command. The machine learning sample repository 308 can store one or more machine learning samples (e.g., machine learning samples 1, 2, . . . , i).

Figure 4:
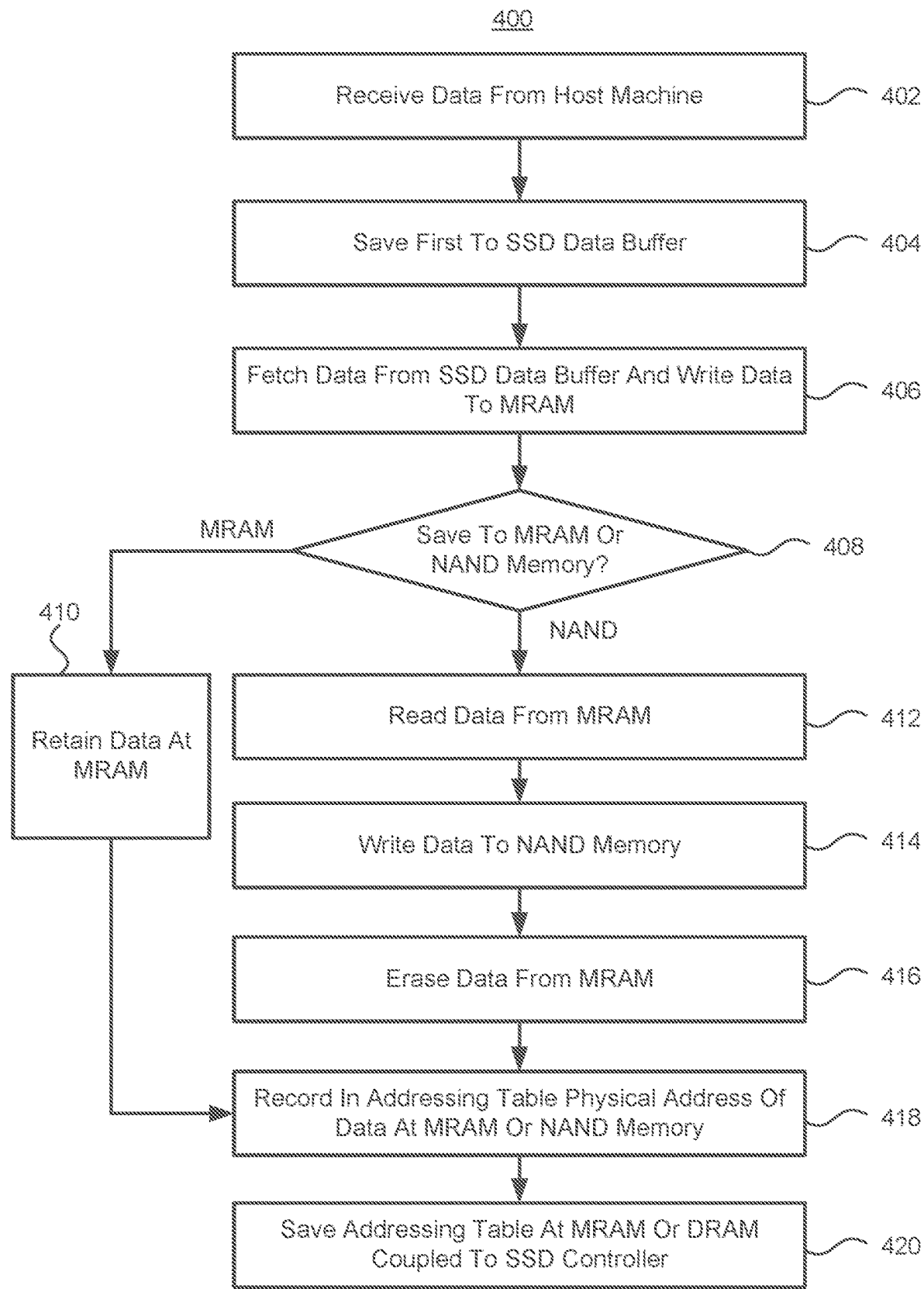
FIG. 4 is a flow chart illustrating a method for processing a write command at an SSD, according to one example embodiment.

FIG. 4 is a flow chart illustrating a method 400 for processing a write command at an SSD, according to one example embodiment. The SSD includes an MRAM, an NAND memory, and an SSD controller. The method 400 may be performed by the SSD controller, e.g., the SSD controller of FIG. 1. At 402, the SSD controller receives a write command including data to be written at the SSD from a host machine. The data may be host data that are used by the host machine for various purpose. In some embodiments, the data may be fetched from a host buffer and sent to the SSD. At 404, the SSD controller save the data to the SSD data buffer (e.g., the SSD data buffer 122 of FIG. 1). At 406, the SSD controller fetches the data from the SSD data buffer and writes the data to the MRAM. In the techniques disclosed herein, whenever the SSD controller receives data to be saved at the SSD, it saves the data to the MRAM before it decides which memory device at the SSD to save the data.

At 408, the SSD controller determines whether to save the data to the MRAM or the NAND memory. If the SSD controller determines that the data are to be saved to the MRAM, at 410 the SSD controller retains the data at the MRAM and takes no further action with respect to the data. If the SSD controller determines that the data are to be saved to the NAND memory, at 412 the SSD controller fetches/reads the data from the MRAM. At 414, the SSD controller writes the data to the NAND memory. At 416, the SSD controller erases the data from the MRAM to free up the storage space at the MRAM. At 418, the SSD controller records in an addressing table a physical address of the first data at the MRAM or the NAND memory. At 420, the SSD controller saves the addressing table to the MRAM or a DRAM of the SSD.

Figure 5:
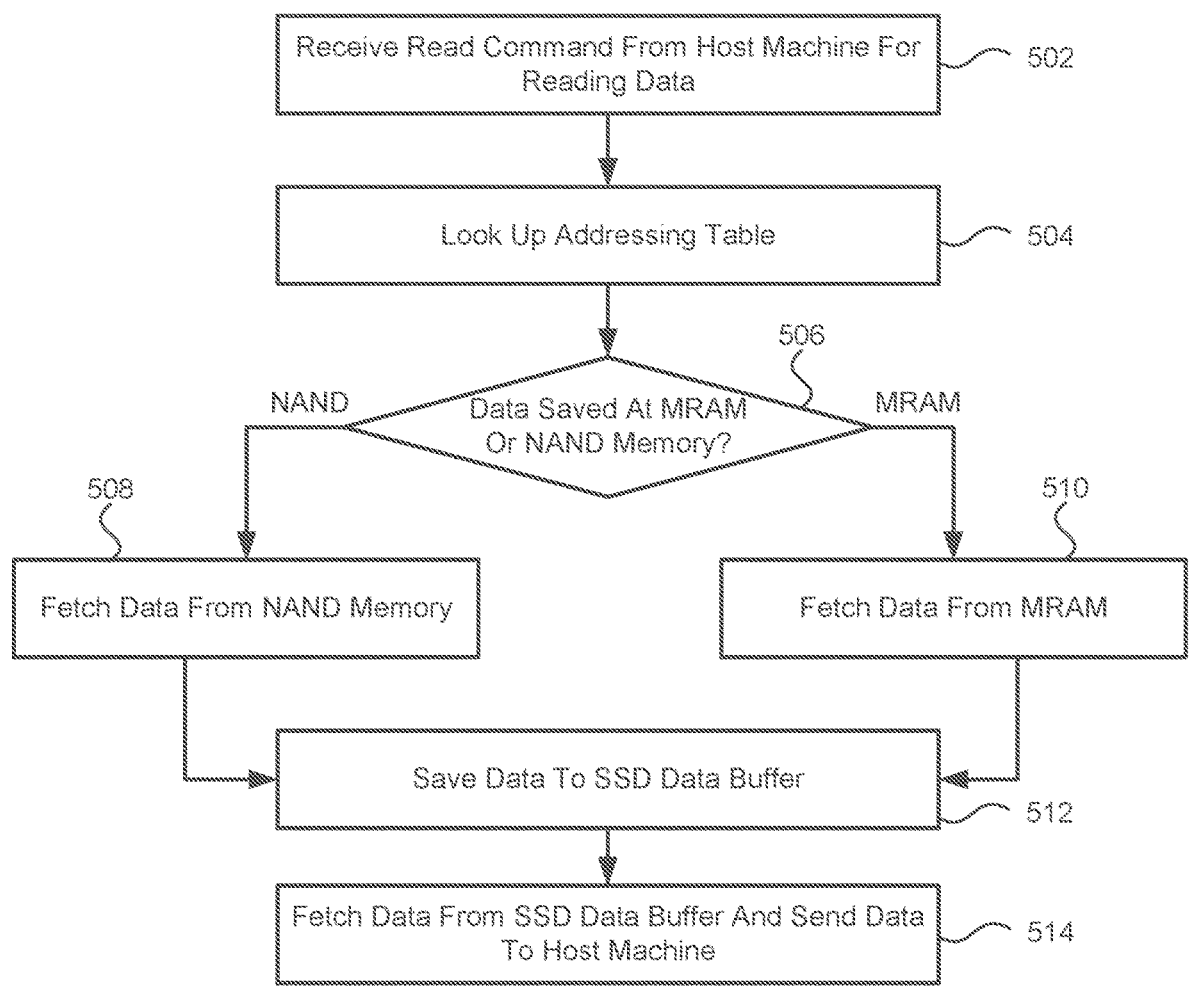
FIG. 5 is a flow chart illustrating a method for processing a read command at an SSD, according to one example embodiment.

FIG. 5 is a flow chart illustrating a method 500 for processing a read command at an SSD, according to one example embodiment. The SSD includes an MRAM, an NAND memory, and an SSD controller. The method 500 may be performed by the SSD controller, e.g., the SSD controller of FIG. 1. At 502, the SSD controller receives a read command from a host machine for reading data. At 504, the SSD controller looks up the addressing table to find the physical address of the requested data. The addressing table is configured to store mapping relations between a plurality of data and their corresponding physical addresses at the MRAM or the NAND memory. At 506, the SSD controller determines whether the data are saved at the MRAM or the NAND memory based on the lookup of the addressing table. If the data are saved at the NAND memory, at 508 the SSD controller fetches the data from the NAND memory. If the data are saved at the MRAM, at 510 the SSD controller fetches the data from the MRAM. At 512, the SSD controller saves the data fetched from the MRAM or the NAND memory to the SSD data buffer. At 514, the SSD controller fetches the data from the SSD data buffer and sends the data to the host machine.

Figure 6:
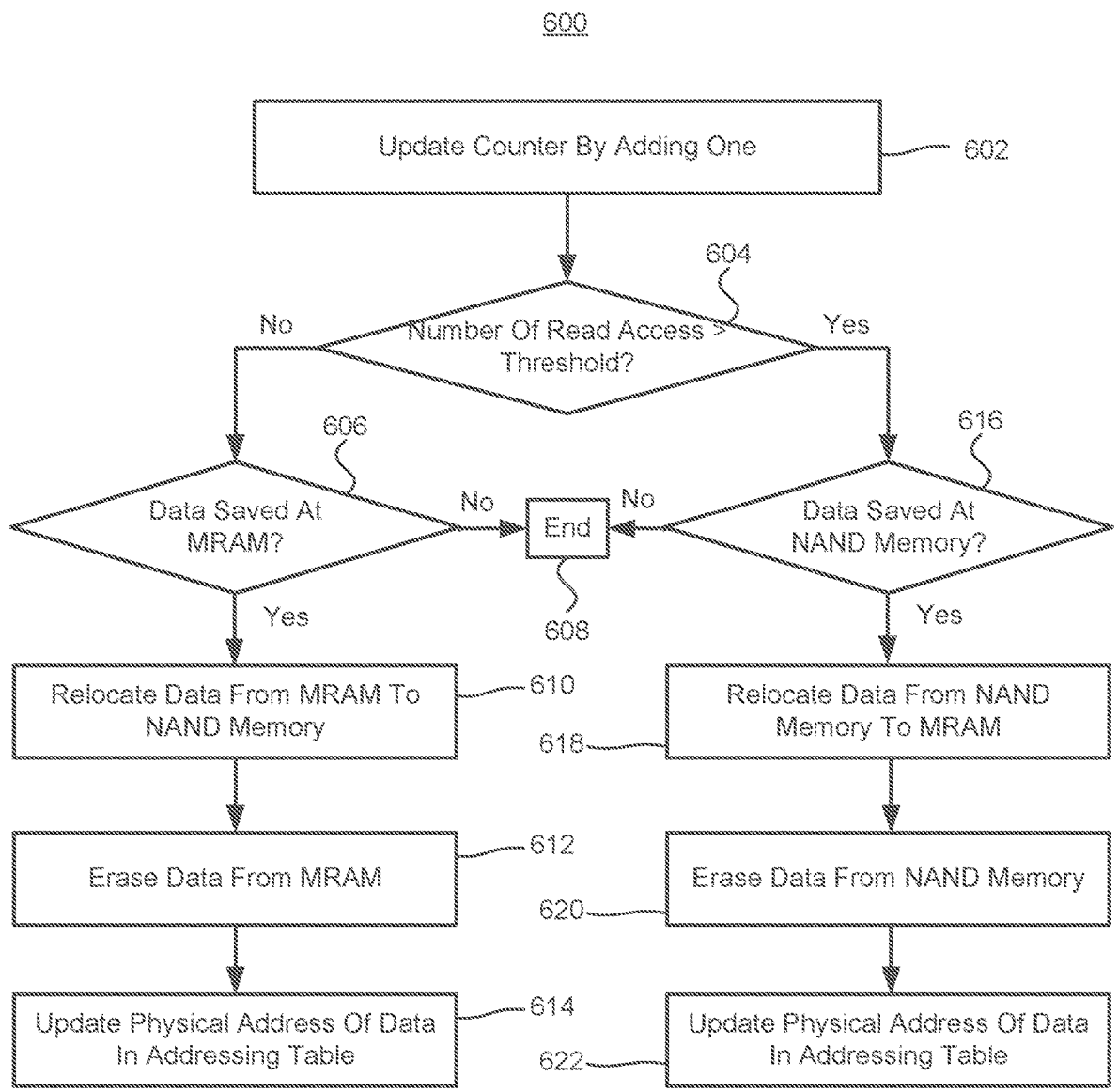
FIG. 6 is a flow chart illustrating a method for relocating data at an SSD based on the data's popularity, according to one example embodiment.

FIG. 6 is a flow chart illustrating a method 600 for relocating data at an SSD based on the data's popularity, according to one example embodiment. The SSD includes an MRAM, an NAND memory, and an SSD controller. The method 600 may be performed by the SSD controller, e.g., the SSD controller of FIG. 1. The SSD controller maintains a counter for data. At 602, after a read access to the data, the SSD controller updates the counter by adding one. At 604, the SSD controller whether a number of read access from the host machine to the data over a time duration exceeds a threshold. This operation determine how frequent the host machine requests to read the data. If the number of read access from the host machine to the data over the time duration does not exceed the threshold, the SSD controller determines that the data are "cold" and, at 606, determines whether the data are saved at the MRAM. If the cold data are not saved at the MRAM, at 608 the SSD controller retains the data to where it is currently saved (e.g., at the NAND memory). If the cold data are saved at the MRAM, at 610 the SSD controller relocates the data from the MRAM to the NAND memory. To improve the efficiency of the SSD, less frequented data are removed from the MRAM to make room for more frequented data. At 612 the SSD controller erases the data from the MRAM. At 614, the SSD controller updates the physical address of the data now saved at the NAND memory.

If it is determined that the number of read access from the host machine to the data over the time duration exceeds the threshold, the SSD controller determines that the data are "hot" and, at 616, determines whether the data are saved at the NAND memory. If the hot data are not saved at the NAND memory, at 608 the SSD controller retains the data to where it is currently saved (e.g., at the MRAM). If the hot data are saved at the NAND memory, at 618 the SSD controller relocates the data from the NAND memory to the MRAM. Because read latency of the MRAM is lower than that of the NAND memory, this operation can prepare the hot data to be quick accessed next time. At 620, the SSD controller erases the data from the NAND memory. At 622, the SSD controller updates the physical address of the data now saved at the MRAM. The method 620 may be performed each time the SSD controller receives a read command from the host machine. The method 620 allows the SSD controller to relocate data between the MRAM and the NAND memory depending on how frequent the data are accessed to reduce the access latency and improve the efficiency of the system having the SSD and the host machine.

Figure 7:
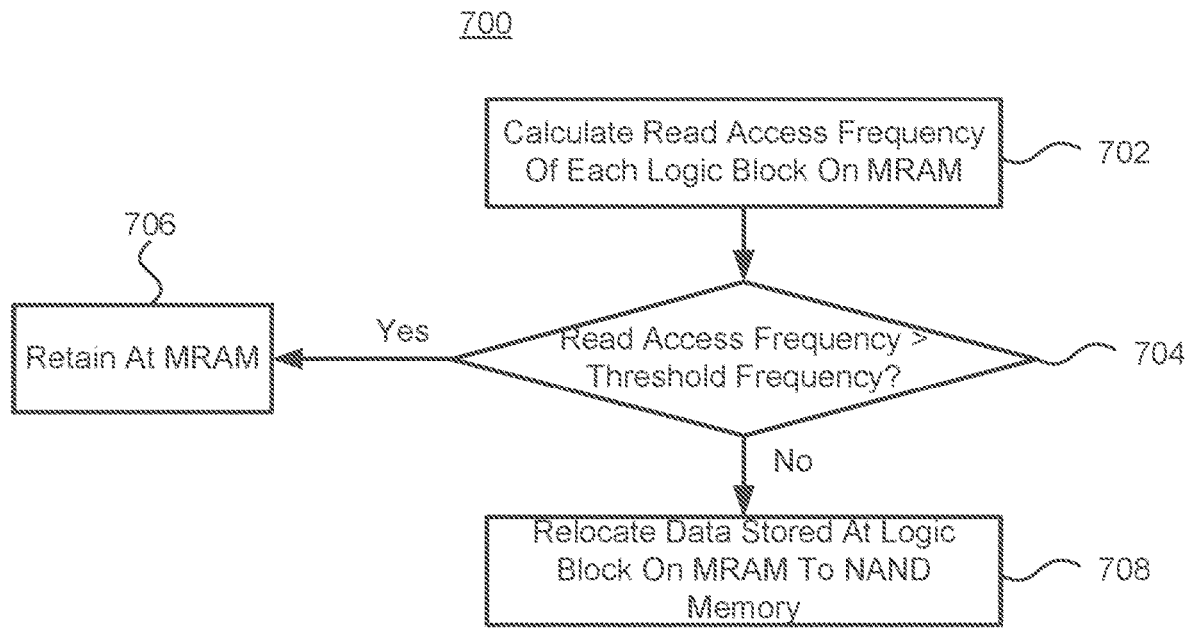
FIG. 7 is a flow chart illustrating a method for relocating data at an SSD based on the data's popularity, according to one example embodiment.

FIG. 7 is a flow chart illustrating a method 700 for relocating data at an SSD based on the data's popularity, according to one example embodiment. The SSD includes an MRAM, an NAND memory, and an SSD controller. The method 700 may be performed by the SSD controller, e.g., the SSD controller of FIG. 1. At 702, the SSD controller calculates (e.g., via the compute circuit 120 of FIG. 1) a read access frequency of each logic block on the MRAM. The SSD controller may select a threshold frequency based on a storage capacity of the MRAM. At 704, the SSD controller determines whether the read access frequency of each logic block on the MRAM exceeds the threshold frequency. If the read access frequency of the logic block on the MRAM exceeds the threshold frequency, at 706 the SSD controller retains the data stored at the logic block at the MRAM. If the read access frequency of the logic block on the MRAM does not exceed the threshold frequency, at 708 the SSD controller relocates data stored at the logic block on the MRAM to the NAND memory. These operations relocate data that are once frequented by the host machine but becomes less accessed by the host machine from the MRAM to the NAND memory to free up space at the MRAM for other data.

Figure 8:
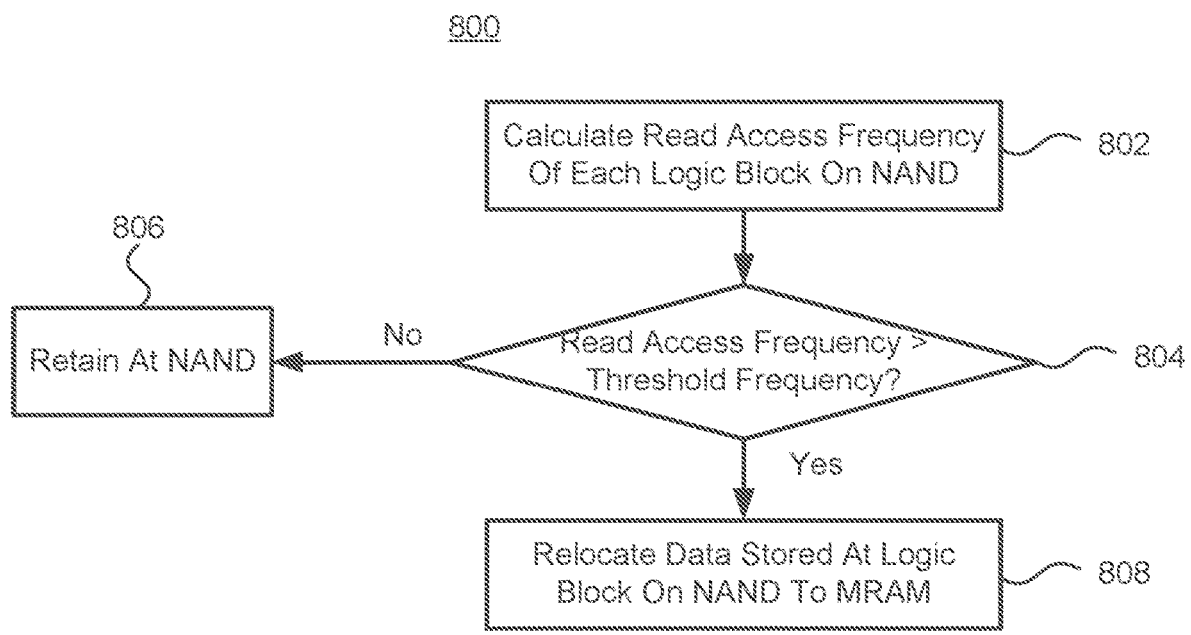
FIG. 8 is a flow chart illustrating a method for relocating data at an SSD based on the data's popularity, according to one example embodiment.

FIG. 8 is a flow chart illustrating a method 800 for relocating data at an SSD based on the data's popularity, according to one example embodiment. The SSD includes an MRAM, an NAND memory, and an SSD controller. The method 800 may be performed by the SSD controller, e.g., the SSD controller of FIG. 1. At 802, the SSD controller calculates (e.g., via the compute circuit 120 of FIG. 1) a read access frequency of each logic block on the NAND memory. The SSD controller may select a threshold frequency based on a storage capacity of the MRAM. At 804, the SSD controller determines whether the read access frequency of each logic block on the NAND memory exceeds the threshold frequency. If the read access frequency of the logic block on the NAND memory does not exceed the threshold frequency, at 806 the SSD controller retains the data stored at the logic block at the NAND memory. If the read access frequency of the logic block on the NAND memory exceeds the threshold frequency, at 808 the SSD controller relocates data stored at the logic block on the NAND memory to the MRAM. These operations relocate data that are once less frequented by the host machine but becomes more accessed by the host machine from the NAND memory to the MRAM to reduce access latency of the data in the future.

Figure 9:
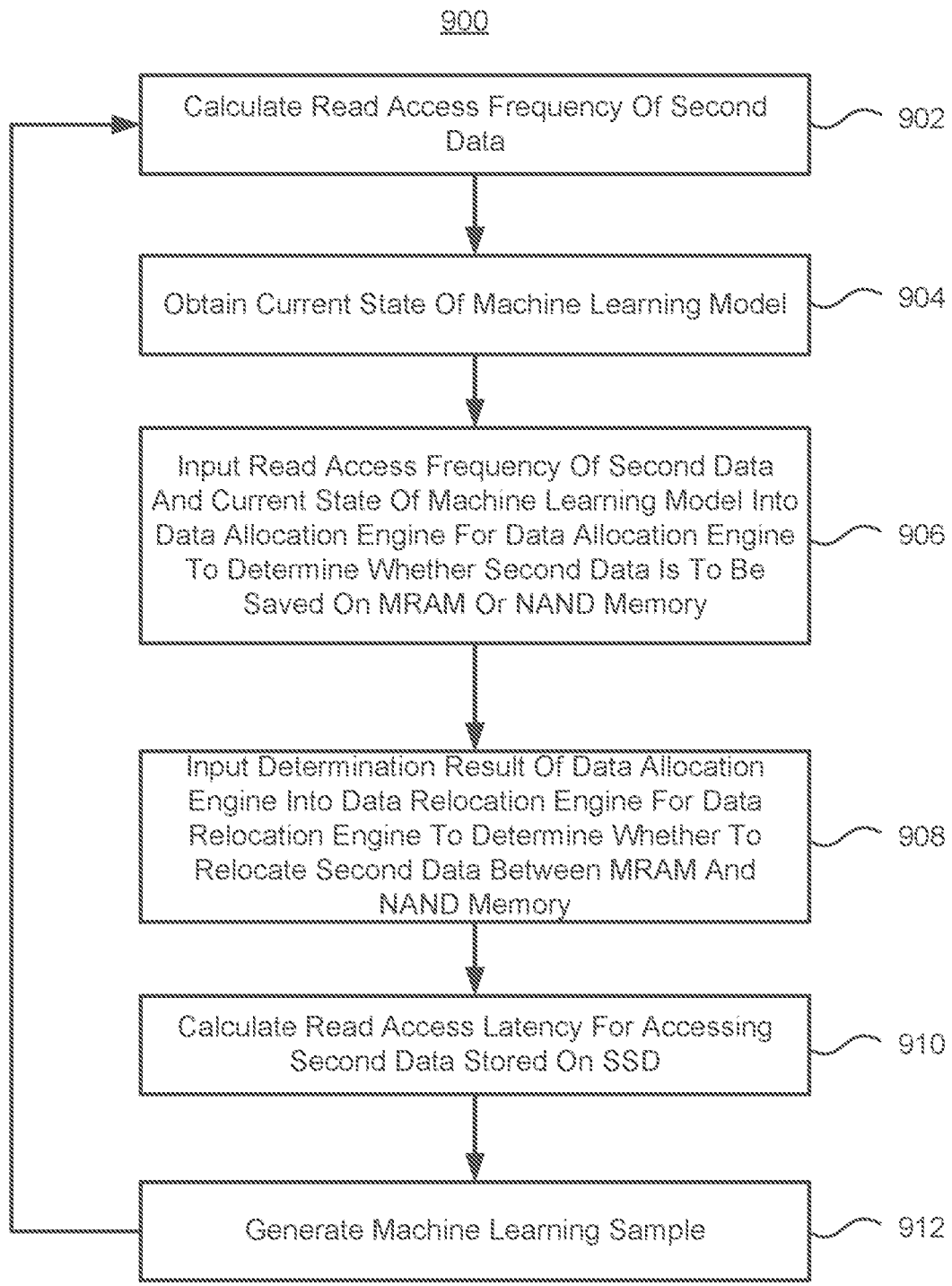
FIG. 9 is a flow chart illustrating a method for managing storage at an SSD, according to one example embodiment.

FIG. 9 is a flow chart illustrating a method 900 for managing storage at an SSD, according to one example embodiment. The SSD includes an MRAM, an NAND memory, and an SSD controller. The method 900 may be performed by the SSD controller, e.g., the SSD controller of FIG. 1. The SSD controller includes a machine learning model for managing the storage at the SSD. The machine learning model includes a data allocation engine and a data relocation engine. At 902, when receiving a read command from the host machine for reading data stored on the SSD, the machine learning model calculates a read access frequency of the data. At 904, the machine learning model obtains a current state of the machine learning model. At 906, the machine learning model inputs the read access frequency of the data and the current state of the machine learning model into the data allocation engine for the data allocation engine to determine whether the data are to be saved on the MRAM or the NAND memory and to generate a determination result. The determination result indicates the data are to be saved on the MRAM or the NAND memory based on its read access frequency.

At 908, the machine learning model inputs the determination result of the data allocation engine into the data relocation engine for the data relocation engine to determine whether to relocate the data between the MRAM and the NAND memory. For example, if the data are to be saved on the MRAM but are currently saved at the NAND memory, the data relocation engine outputs a determination result indicating relocating the data from the NAND memory to the MRAM. If the data are to be saved on the MRAM and are currently saved at the MRAM, the data relocation engine outputs a determination result indicating retaining the data at the MRAM. At 910, the machine learning model calculates a read access latency for accessing the data stored on the SSD. At 912, the machine learning model calculates a machine learning sample including the read access frequency of the data, the current state of the machine learning model, the output of the data relocation engine, and the read access latency. The machine learning model may generate a machine learning sample each time a read command is received from the host machine as the process returns to 902 after 912.

In the techniques disclosed herein, MRAM can provide high write/read bandwidth, and is used as a write buffer to improve SSD overall performance. When QLC NAND is employed as data storage, the SSD can achieve both high capacities and high performance.

The techniques disclosed herein (e.g., an MRAM and QLC NAND hybrid system) can reduce design complexity for power loss protection. Since MRAM is non-volatile, power loss back-up is no longer needed.

In the techniques disclosed herein, by including a data allocation circuit in a SSD controller, data can be separated and stored in different memory segments, MRAM or NAND, and the system can auto-adjust data placement, thereby improving memory access latency of the system. By relocating hot data from NAND to MRAM, it reduces system garbage collection time, reducing write amplification factor (WAF) of the SSD and improving overall performance.

The techniques provides a SSD architecture with MRAM and NAND hybrid memory/storage system, where MRAM is used as write buffer and cache to save hot data and system meta data.

In some embodiments, the techniques provide the data placement path where host data are first written to MRAM and re-written to NAND. In this way, power loss issue of the NAND can be solved and SSD access speed and capacity can both be improved.

In some embodiments, the techniques provide a data allocation circuit, which uses a machine learning model to make a decision on data placement. Hot data is maintained on MRAM while cold data is maintained on NAND.

In some embodiments, the techniques provide a data allocation engine, which uses data access frequency as input and read latency as feedback, and outputs the decision on whether to write data on MRAM or NAND.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. A solid state drive (SSD) comprising:
   a magnetoresistive random-access memory (MRAM);
   a NAND memory; and
   an SSD controller coupled to the MRAM and the NAND memory, wherein the SSD controller comprises:
     a data allocation circuit configured to determine saving data to one of the MRAM or the NAND memory; and
     an MRAM controller coupled to the MRAM and configured to read data from or write data to the MRAM,
   wherein the SSD controller is configured to:
     receive first data from a host machine;
     save the first data to an SSD data buffer;
     fetch the first data from the SSD data buffer and write the first data to the MRAM via the MRAM controller;
     determine, by the data allocation circuit based on a characteristic of the first data, whether to save the first data to the MRAM or the NAND memory;
     in response to determining saving the first data to the NAND memory, read the first data from the MRAM, write the first data to the NAND memory, and erase the first data from the MRAM,
   wherein the data allocation circuit is further configured to:
     calculate a read access frequence of a logic block in the NAND memory,
     determine whether the read access frequency of the logic block exceeds a threshold frequency determined based on a storage capacity of the MRAM, wherein the threshold frequency is inversely related to the storage capacity of the MRAM, and in response to determining the read access frequency of the logic block exceeding the threshold frequency, relocate data stored on the logic block on the NAND memory to the MRAM.

2. The SSD of claim 1, wherein the SSD controller is configured to:

in response to determining saving the first data to the MRAM, retain the first data at the MRAM.

3. The SSD of claim 2, wherein the SSD controller is further configured to record in an addressing table a physical address of the first data at the MRAM or the NAND memory.

4. The SSD of claim 3, wherein the SSD controller is further configured to save the addressing table at the MRAM or a dynamic random-access memory (DRAM) coupled to the SSD controller.

5. The SSD of claim 3, wherein the SSD controller is further configured to:

receive a read command from the host machine for reading second data;

look up, by the data allocation circuit, the addressing table to determine whether the second data are saved at the MRAM or the NAND memory;

in response to determining that the second data are saved at the MRAM, fetch the second data from the MRAM and save the second data to the SSD data buffer;

in response to determining that the second data are saved at the NAND memory, fetch the second data from the NAND memory and save the second data to the SSD data buffer; and fetch the second data from the SSD data buffer and send the second data to the host machine.

6. The SSD of claim 5, wherein the SSD controller is further configured to:

determine whether a number of read access from the host machine to the second data over a time duration exceeds a threshold;

in response to that the number of read access to the second data over the time duration from the host machine exceeds the threshold and in response to determining that the second data are saved at the NAND memory, relocate the second data from the NAND memory to the MRAM, erase the second data from the NAND memory, and update a physical address of the second data in the addressing table.

7. The SSD of claim 1, wherein the data allocation circuit is further configured to:

calculate a read access frequency of each logic block on the MRAM;

determining whether the read access frequency of each logic block on the MRAM exceeds the threshold frequency; and in response to determining that a read access frequency of a logic block on the MRAM does not exceed the threshold frequency, relocate data stored at the logic block on the MRAM to the NAND memory.

8. The SSD of claim 1, wherein the data allocation circuit comprises a machine learning model, the machine learning model comprises a data allocation engine and a data relocation engine, and is configured to, in response to receiving a read command from the host machine for reading second data stored on the SSD:

calculate a read access frequency of the second data;
obtain a current state of the machine learning model;

input the read access frequency of the second data and the current state of the machine learning model into the data allocation engine for the data allocation engine to determine whether the second data are to be saved on the MRAM or the NAND memory and to generate a determination result;

input the determination result of the data allocation engine into the data relocation engine for the data relocation engine to determine whether to relocate the second data between the MRAM and the NAND memory;

calculate a read access latency for accessing the second data stored on the SSD; and generate a machine learning sample comprising the read access frequency of the second data, the current state of the machine learning model, an output of the data relocation engine, and the read access latency.

9. The SSD of claim 1, wherein the SSD controller is further configured to flush, in response to a power loss, all data at the SSD data buffer to the MRAM.

10. An apparatus comprising a host machine and a solid state drive (SSD), wherein the SSD comprises:

a magnetoresistive random-access memory (MRAM);
a NAND memory; and
an SSD controller coupled to the MRAM and the NAND memory, wherein the SSD controller comprises:

a data allocation circuit configured to determine saving data to one of the MRAM or the NAND memory; and an MRAM controller coupled to the MRAM and configured to read data from or write data to the MRAM, wherein the SSD controller is configured to:
receive first data from a host machine;
save the first data to an SSD data buffer;
fetch the first data from the SSD data buffer and write the first data to the MRAM via the MRAM controller;

determine, by the data allocation circuit based on a characteristic of the first data, whether to save the first data to the MRAM or the NAND memory;

in response to determining saving the first data to the NAND memory, read the first data from the MRAM, write the first data to the NAND memory, and erase the first data from the MRAM, wherein the data allocation circuit is further configured to:

calculate a read access frequence of a logic block in the NAND memory, determine whether the read access frequency of the logic block exceeds a threshold frequency determined based on a storage capacity of the MRAM, wherein the threshold frequency is inversely related to the storage capacity of the MRAM, and in response to determining the read access frequency of the logic block exceeding the threshold frequency, relocate data stored on the logic block on the NAND memory to the MRAM.

11. The apparatus of claim 10, wherein the SSD controller is configured to:

in response to determining saving the first data to the MRAM, retain the first data at the MRAM.

12. The apparatus of claim 11, wherein the SSD controller is further configured to record in an addressing table a physical address of the first data at the MRAM or the NAND memory.

13. The apparatus of claim 12, wherein the SSD controller is further configured to save the addressing table at the MRAM or a dynamic random-access memory (DRAM) coupled to the SSD controller.

14. The apparatus of claim 12, wherein the SSD controller is further configured to:
receive a read command from the host machine for reading second data;
look up, by the data allocation circuit, the addressing table to determine whether the second data are saved at the MRAM or the NAND memory;
in response to determining that the second data are saved at the MRAM, fetch the second data from the MRAM and save the second data to the SSD data buffer;
in response to determining that the second data are saved at the NAND memory, fetch the second data from the NAND memory and save the second data to the SSD data buffer; and
fetch the second data from the SSD data buffer and send the second data to the host machine.

15. The apparatus of claim 14, wherein the SSD controller is further configured to:
determine whether a number of read access from the host machine to the second data over a time duration exceeds a threshold;
in response to that the number of read access to the second data over the time duration from the host machine exceeds the threshold and in response to determining that the second data are saved at the NAND memory, relocate the second data from the NAND memory to the MRAM, erase the second data from the NAND memory, and update a physical address of the second data in the addressing table.

16. The apparatus of claim 10, wherein the data allocation circuit is further configured to:
calculate a read access frequency of each logic block on the MRAM;
determining whether the read access frequency of each logic block on the MRAM exceeds the threshold frequency; and
in response to determining that a read access frequency of a logic block on the MRAM does not exceed the threshold frequency, relocate data stored at the logic block on the MRAM to the NAND memory.

17. The apparatus of claim 10, wherein the data allocation circuit comprises a machine learning model, the machine learning model comprises a data allocation engine and a data relocation engine, and is configured to, in response to receiving a read command from the host machine for reading second data stored on the SSD:
calculate a read access frequency of the second data;
obtain a current state of the machine learning model;
input the read access frequency of the second data and the current state of the machine learning model into the data allocation engine for the data allocation engine to determine whether the second data are to be saved on the MRAM or the NAND memory and to generate a determination result;
input the determination result of the data allocation engine into the data relocation engine for the data relocation engine to determine whether to relocate the second data between the MRAM and the NAND memory;
calculate a read access latency for accessing the second data stored on the SSD; and
generate a machine learning sample comprising the read access frequency of the second data, the current state of the machine learning model, an output of the data relocation engine, and the read access latency.

18. The apparatus of claim 10, wherein the SSD controller is further configured to flush, in response to a power loss, all data at the SSD data buffer to the MRAM.

19. A method of operating a solid state drive (SSD) that comprises a magnetoresistive random-access memory (MRAM), a NAND memory, and an SSD controller coupled to the MRAM and the NAND memory, the method comprising:
receiving, by the SSD controller, first data from a host machine;
saving, by the SSD controller, the first data to an SSD data buffer;
fetching, by the SSD controller, the first data from the SSD data buffer and write the first data to the MRAM;
determining, by the SSD controller based on a characteristic of the first data, whether to save the first data to the MRAM or the NAND memory;
in response to determining saving the first data to the NAND memory, reading, by the SSD controller, the first data from the MRAM, writing the first data to the NAND memory, and erasing the first data from the MRAM,
calculating, by the SSD controller, a read access frequency of a logic block in the NAND memory,
determining, by the SSD controller, whether the read access frequency of the logic block exceeds a threshold frequency determined based on a storage capacity of the MRAM, wherein the threshold frequency is inversely related to the storage capacity of the MRAM, and
in response to determining the read access frequency of the logic block exceeding the threshold frequency, relocating, by the SSD controller, data stored on the logic block on the NAND memory to the MRAM.

20. The method of claim 19, wherein the SSD controller comprises a machine learning model, wherein the machine learning model comprises a data allocation engine and a data relocation engine, and is configured to, in response to receiving a read command from the host machine for reading second data stored on the SSD:
calculate a read access frequency of the second data;
obtain a current state of the machine learning model;
input the read access frequency of the second data and the current state of the machine learning model into the data allocation engine for the data allocation engine to determine whether the second data are to be saved on the MRAM or the NAND memory and to generate a determination result;
input the determination result of the data allocation engine into the data relocation engine for the data relocation engine to determine whether to relocate the second data between the MRAM and the NAND memory;
calculate a read access latency for accessing the second data stored on the SSD; and
generate a machine learning sample comprising the read access frequency of the second data, the current state of the machine learning model, an output of the data relocation engine, and the read access latency.

* * * * *